US012646214B2

(12) United States Patent
Xu et al.

(10) Patent No.: US 12,646,214 B2
(45) Date of Patent: Jun. 2, 2026

(54) RECOGNITION PROCESSING METHOD AND DEVICE AND NON-TRANSIENT COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 704 days.

(21) Appl. No.: 18/019,237

(22) PCT Filed: Jul. 12, 2021

(86) PCT No.: PCT/CN2021/105861
§ 371 (c)(1),
(2) Date: Feb. 1, 2023

(87) PCT Pub. No.: WO2022/028210
PCT Pub. Date: Feb. 10, 2022

(65) Prior Publication Data
US 2023/0290004 A1 Sep. 14, 2023

(30) Foreign Application Priority Data

Aug. 3, 2020 (CN) ........................ 202010767628.X

(51) Int. Cl.
| | |
|---|---|
| *G06T 7/90* | (2017.01) |
| *G06T 5/70* | (2024.01) |
| *G06V 10/74* | (2022.01) |

(52) U.S. Cl.
CPC .................. *G06T 7/90* (2017.01); *G06T 5/70* (2024.01); *G06V 10/761* (2022.01)

(58) Field of Classification Search
CPC ....... G06T 7/90; G06T 5/70; G06V 10/40–62; G06V 10/70–761; G06V 10/761
See application file for complete search history.

(56) References Cited

U.S. PATENT DOCUMENTS

| | | | | |
|---|---|---|---|---|
| 6,625,319 | B1 * | 9/2003 | Krishnamachari | .... H04N 19/51 |
| | | | | 382/173 |
| 8,391,615 | B2 * | 3/2013 | Wu | ........................ G06V 20/10 |
| | | | | 382/218 |

(Continued)

FOREIGN PATENT DOCUMENTS

| | | |
|---|---|---|
| CN | 103929629 | 7/2014 |
| CN | 104731894 | 6/2015 |

(Continued)

OTHER PUBLICATIONS

Lu, Anqin et al., "Research on Deep Interactive image Segmentation Method Incorporating Extreme Points Feature", Information & Communications, Jun. 15, 2020, with English abstract, pp. 66-69, vol. 6.

(Continued)

*Primary Examiner* — Sean T Motsinger
(74) *Attorney, Agent, or Firm* — JCIPRNET

(57) ABSTRACT

The present disclosure relates to a recognition processing method and device and a non-transient computer readable storage medium. The recognition processing method comprises: obtaining first thermal distribution data of an input image, and, according to the first thermal distribution data, calculating first color feature data of the input image; obtaining second thermal distribution data of each candidate image among multiple candidate images, and, according to each item of second thermal distribution data, respectively calculating second color feature data of a corresponding candidate image; calculating the color similarity distance between the first color feature data and each item of second (Continued)

Obtaining first thermal distribution data of an input image, and calculating first color feature data of the input image according to the first thermal distribution data — S100

Obtaining second thermal distribution data of each candidate image among multiple candidate images respectively, and calculating second color feature data of a corresponding candidate image respectively according to each second thermal distribution data — S200

Calculating the color similarity distance between the first color feature data and each second color feature data respectively, and determining the candidate image, among the multiple candidate images, that matches the color of the input image as an output image according to each color similarity distance — S300 color feature data respectively, and, according to each color similarity distance, determining the candidate image, among the multiple candidate images, that matches the color of the input image as an output image.

17 Claims, 6 Drawing Sheets

(56) References Cited

U.S. PATENT DOCUMENTS

| | | | | |
|---|---|---|---|---|
| 8,737,727 | B2 * | 5/2014 | Wang | G06V 10/56 382/165 |
| 9,111,355 | B1 | 8/2015 | Honda et al. | |
| 2008/0025555 | A1 * | 1/2008 | Visan | G06V 30/19013 382/100 |
| 2008/0075360 | A1 * | 3/2008 | Li | G06T 7/90 382/162 |
| 2010/0149400 | A1 * | 6/2010 | Sugino | H04N 23/73 348/E5.022 |
| 2012/0163712 | A1 * | 6/2012 | Nakajima | G06T 7/194 382/165 |
| 2013/0251253 | A1 * | 9/2013 | Nakagome | G06F 16/5854 382/218 |
| 2019/0180432 | A1 * | 6/2019 | Xin | G06V 10/56 |
| 2021/0350176 | A1 * | 11/2021 | Klaiman | G06F 18/214 |
| 2022/0036059 | A1 * | 2/2022 | He | G06V 10/26 |
| 2022/0237788 | A1 * | 7/2022 | Shaul | G16H 50/70 |
| 2022/0254141 | A1 * | 8/2022 | Otsuka | G06V 10/44 |
| 2023/0290004 | A1 * | 9/2023 | Xu | G06T 7/90 |
| 2024/0153108 | A1 * | 5/2024 | Sawada | G06T 7/90 |

FOREIGN PATENT DOCUMENTS

| | | |
|---|---|---|
| CN | 106228150 | 12/2016 |
| CN | 108227912 | 6/2018 |
| CN | 109102549 | 12/2018 |
| CN | 110348463 | 10/2019 |
| CN | 110543838 | 12/2019 |
| CN | 110659647 | 1/2020 |
| CN | 110909791 | 3/2020 |
| CN | 111209861 | 5/2020 |
| CN | 111881994 | 11/2020 |
| EP | 3396370 | 10/2018 |
| JP | 2019145040 | 8/2019 |

OTHER PUBLICATIONS

"Office Action of China Counterpart Application", issued on Aug. 9, 2023, p. 1-p. 7.

"Notice of allowance of China Counterpart Application", issued on Jan. 4, 2024, p. 1-p. 4.

"International Search Report (Form PCT/ISA/210) of PCT/CN2021/105861," mailed on Oct. 20, 2021, with English translation thereof, pp. 1-4.

"Written Opinion of the International Searching Authority (Form PCT/ISA/237) of PCT/CN2021/105861," mailed on Oct. 20, 2021, pp. 1-5.

* cited by examiner

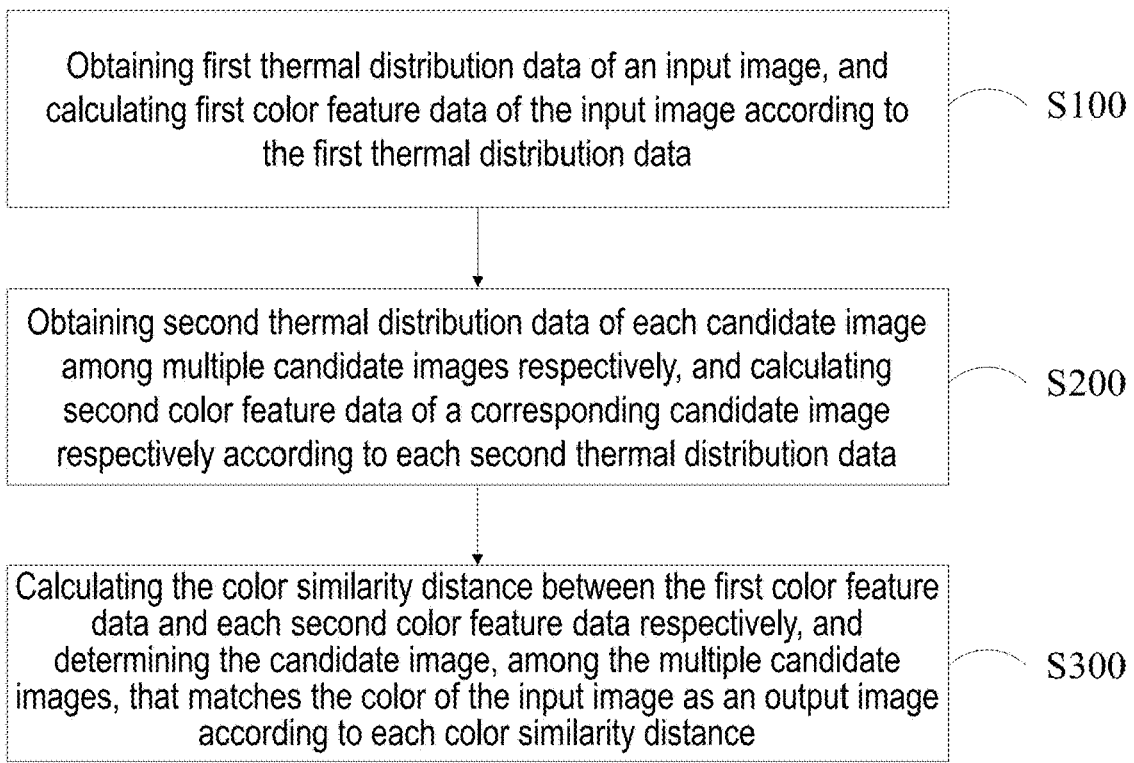

Obtaining first thermal distribution data of an input image, and calculating first color feature data of the input image according to the first thermal distribution data — S100

Obtaining second thermal distribution data of each candidate image among multiple candidate images respectively, and calculating second color feature data of a corresponding candidate image respectively according to each second thermal distribution data — S200

Calculating the color similarity distance between the first color feature data and each second color feature data respectively, and determining the candidate image, among the multiple candidate images, that matches the color of the input image as an output image according to each color similarity distance — S300

FIG. 1

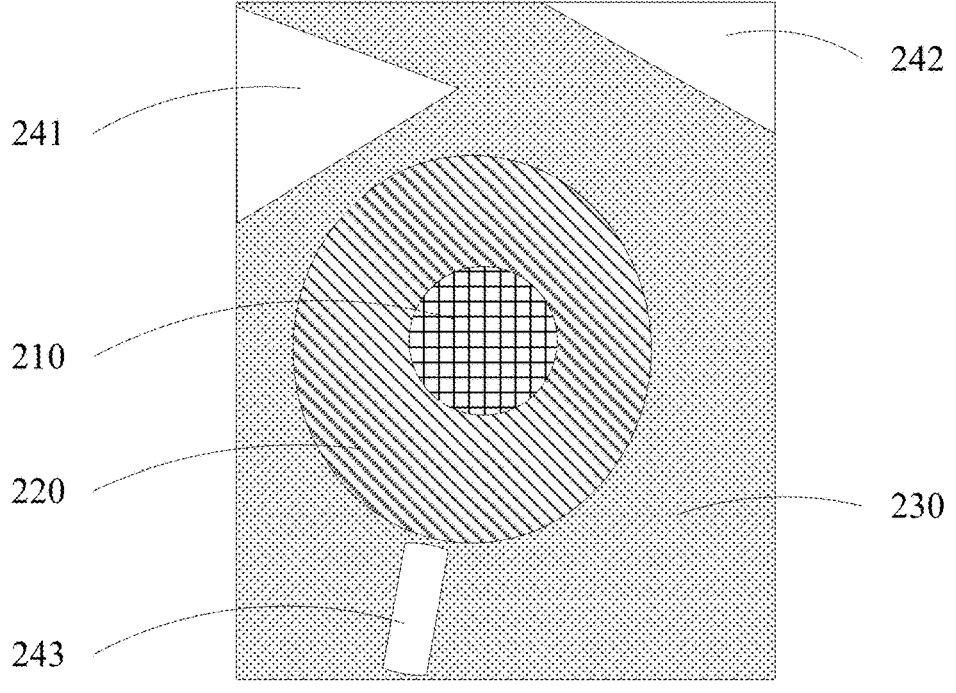

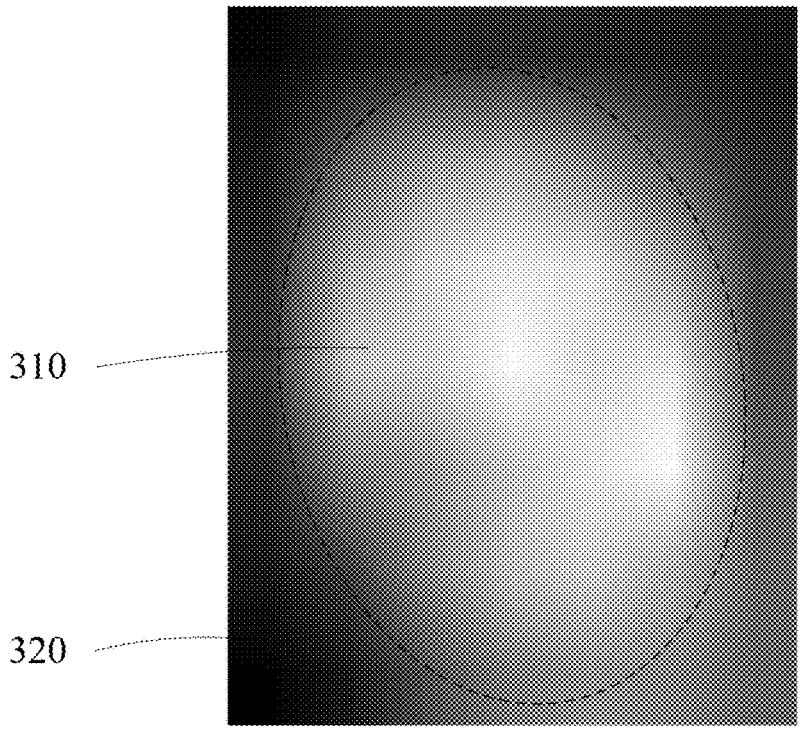

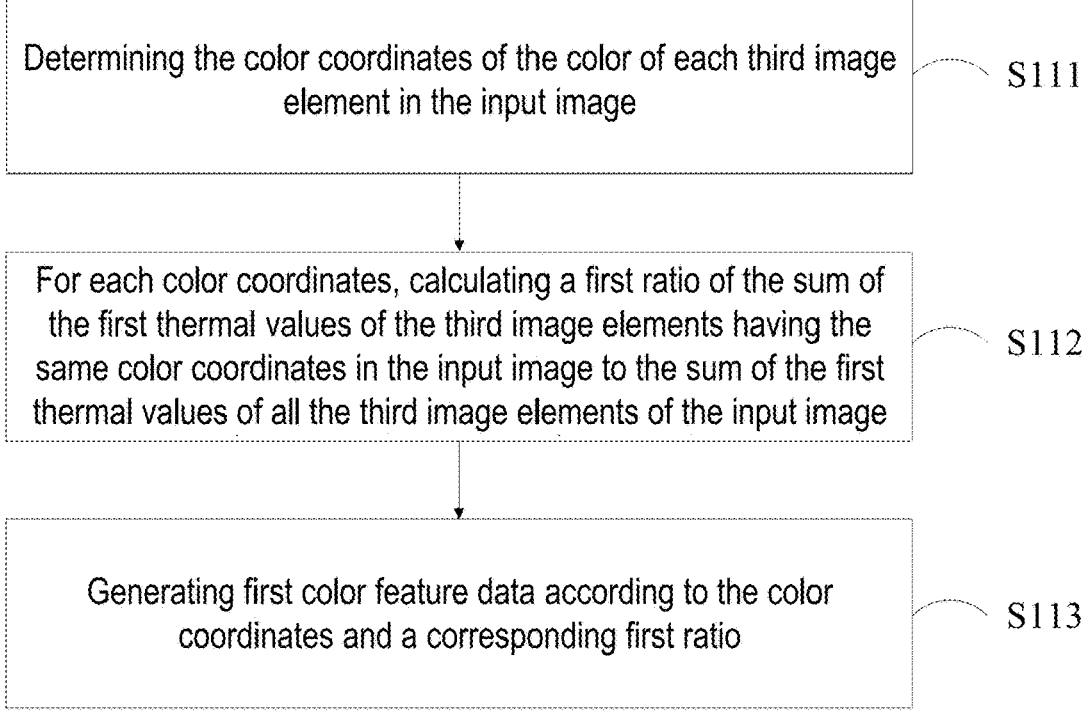

Determining the color coordinates of the color of each third image element in the input image — S111

For each color coordinates, calculating a first ratio of the sum of the first thermal values of the third image elements having the same color coordinates in the input image to the sum of the first thermal values of all the third image elements of the input image — S112

Generating first color feature data according to the color coordinates and a corresponding first ratio — S113

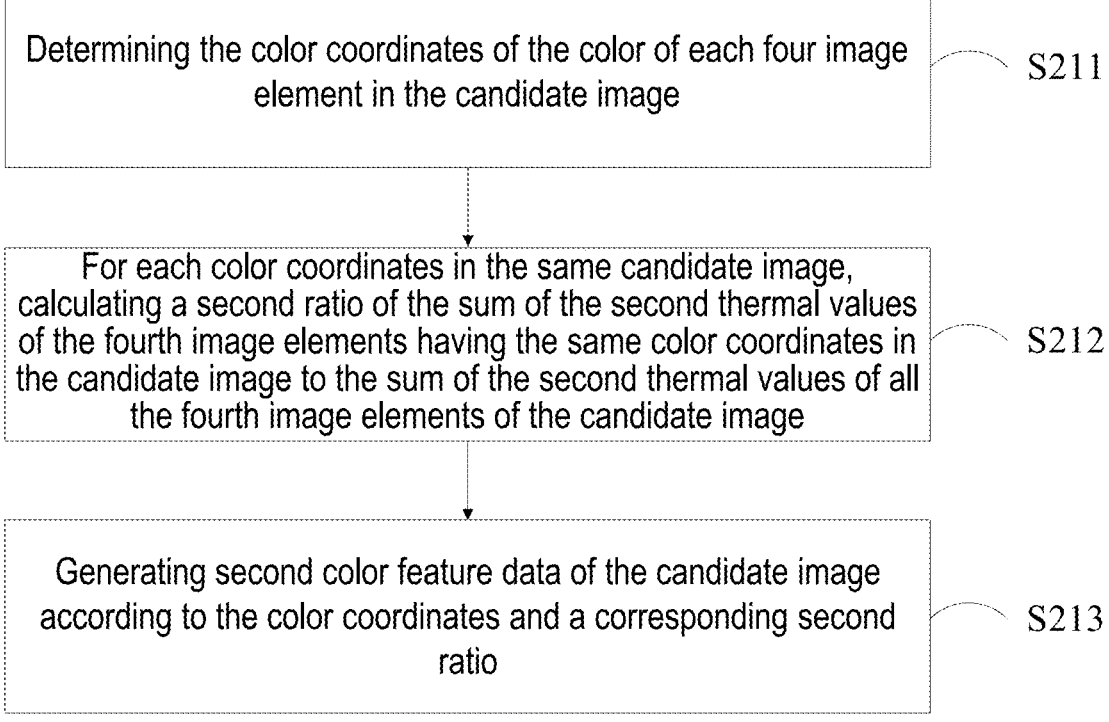

Determining the color coordinates of the color of each four image element in the candidate image ⟩ S211

For each color coordinates in the same candidate image, calculating a second ratio of the sum of the second thermal values of the fourth image elements having the same color coordinates in the candidate image to the sum of the second thermal values of all the fourth image elements of the candidate image ⟩ S212

Generating second color feature data of the candidate image according to the color coordinates and a corresponding second ratio ⟩ S213

FIG. 7

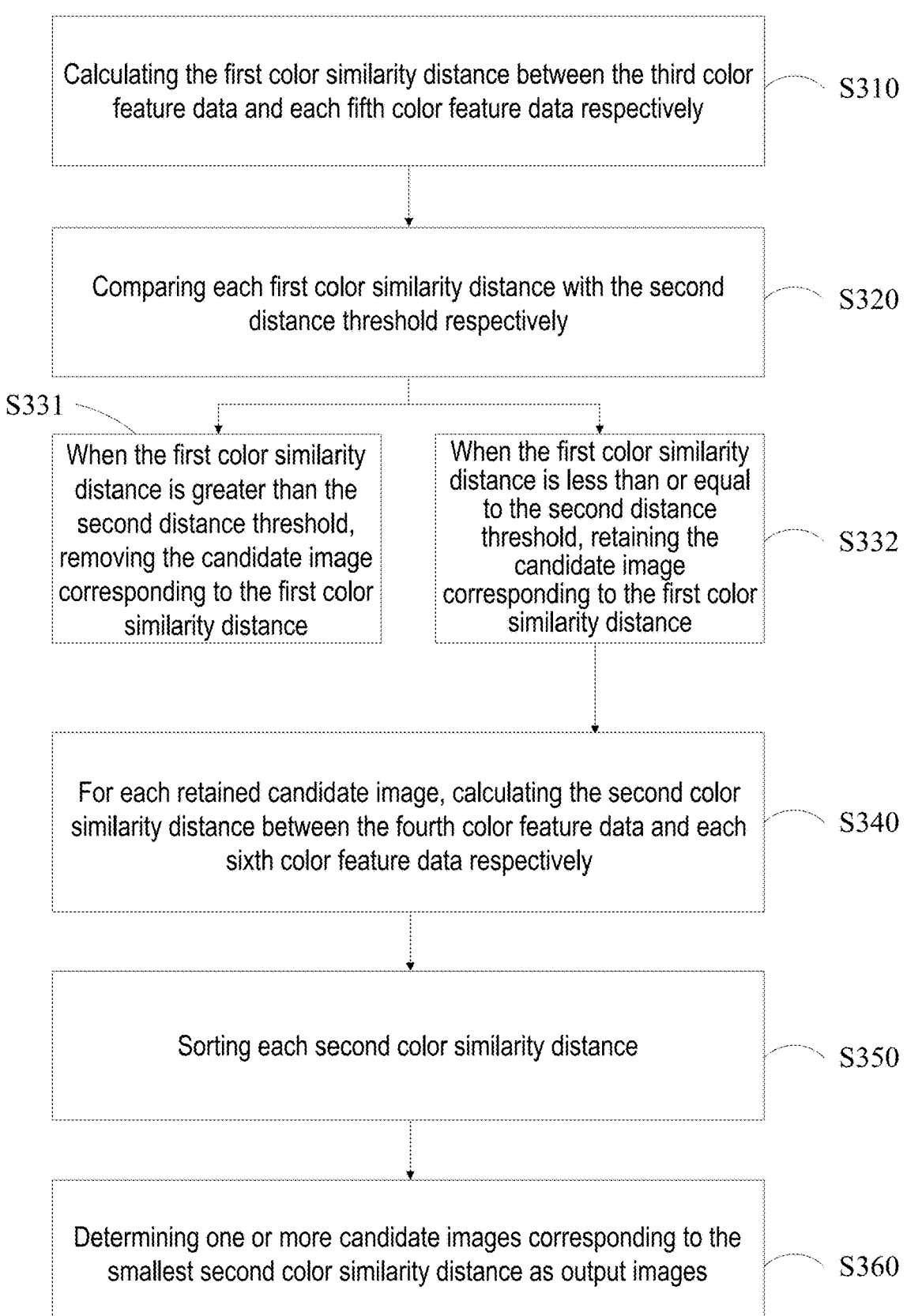

Calculating the first color similarity distance between the third color feature data and each fifth color feature data respectively — S310

Comparing each first color similarity distance with the second distance threshold respectively — S320

S331

When the first color similarity distance is greater than the second distance threshold, removing the candidate image corresponding to the first color similarity distance When the first color similarity distance is less than or equal to the second distance threshold, retaining the candidate image corresponding to the first color similarity distance — S332

For each retained candidate image, calculating the second color similarity distance between the fourth color feature data and each sixth color feature data respectively — S340

Sorting each second color similarity distance — S350

Determining one or more candidate images corresponding to the smallest second color similarity distance as output images — S360

Recognition processing device

RECOGNITION PROCESSING METHOD AND DEVICE AND NON-TRANSIENT COMPUTER-READABLE STORAGE MEDIUM

CROSS-REFERENCE TO RELATED APPLICATION

This application is a 371 of international application of PCT application serial no. PCT/CN2021/105861, filed on Jul. 12, 2021, which claims the priority benefit of China application no. 202010767628.X, filed on Aug. 3, 2020. The entirety of each of the above mentioned patent applications is hereby incorporated by reference herein and made a part of this specification.

TECHNICAL FIELD

The present disclosure relates to the technical field of image recognition, and specifically relates to a recognition processing method, a recognition processing device, and a non-transient computer-readable storage medium.

DESCRIPTION OF RELATED ART

In order to identify a certain object, a user may capture an image of the object and upload the captured image to a device for identifying the object, and the recognition program in the device will recognize the object contained in the image and its related information. After the object is recognized, the device or the recognition program may also output one or more other images corresponding to the object, so that the user may further make comparison and acquire more information based on these output images. However, on the same object, different parts thereof may have different colors, and on the same kind of object, different individuals may also have different colors (for example, the same plant may have flowers with different colors). Under the circumstances, there may be a large difference between the color of the image output by the device or the recognition program and the color of the image uploaded by the user, which will cause confusion and troublesome to the user.

SUMMARY

One of the purposes of the present disclosure is to provide a recognition processing method, a recognition processing device, and a non-transient computer-readable storage medium to determine an output image that matches the color of an input image.

In a first aspect of the present disclosure, a recognition processing method is provided, and the recognition processing method includes: obtaining first thermal distribution data of an input image, and calculating first color feature data of the input image according to the first thermal distribution data, the first thermal distribution data includes a first thermal value of at least a portion of the input image; obtaining second thermal distribution data of each candidate image among multiple candidate images respectively, and calculating second color feature data of a corresponding candidate image respectively according to each second thermal distribution data, the second thermal distribution data of a candidate image includes a second thermal value of at least a portion of the candidate image, and the multiple candidate images are obtained from the recognition of the input image; calculating the color similarity distance between the first color feature data and each second color feature data respectively, and determining the candidate image, among the multiple candidate images, that matches the color of the input image as an output image according to each color similarity distance.

In some embodiments, the step of obtaining first thermal distribution data of an input image includes: using a pre-trained machine learning model to determine a first thermal value of each first image element in the input image; and/or the step of obtaining second thermal distribution data of each candidate image among multiple candidate images respectively includes: for each candidate image, using a pre-trained machine learning model to determine the second thermal value of each second image element respectively in the candidate image.

In some embodiments, the machine learning model includes an attention model, and the attention model is configured to obtain the attention weight for each image element in the image, and the thermal value of the image element increases with the increase of the attention weight.

In some embodiments, the first thermal value is greater than or equal to 0 and less than or equal to 1; and/or the second thermal value is greater than or equal to 0 and less than or equal to 1.

In some embodiments, the step of acquiring the first thermal distribution data of the input image includes: blurring the first thermal value of each portion of the input image to generate smoothed first thermal distribution data; and/or the step of obtaining second thermal distribution data of each candidate image among multiple candidate images respectively includes: for each candidate image, blurring the second thermal value of each portion of the candidate image to generate smoothed second thermal distribution data of the candidate image.

In some embodiments, the blurring includes at least one of Gaussian blurring, box blurring and median blurring.

In some embodiments, the step of calculating the first color feature data of the input image according to the first thermal distribution data includes: determining the color coordinates of the color of each third image element in the input image, each coordinate component of the color coordinates respectively indicates the grayscale interval that the color falls within on each color channel; for each color coordinates, calculating a first ratio of the sum of the first thermal values of the third image elements having the same color coordinates in the input image to the sum of the first thermal values of all the third image elements of the input image; generating the first color feature data according to the color coordinates and a corresponding first ratio; and/or the step of calculating the second color feature data of a corresponding candidate image respectively according to each second thermal distribution data includes: perform the following operations for each candidate image: determining a color coordinates of the color of each fourth image element in the candidate image; for each color coordinates in the same candidate image, calculating a second ratio of the sum of the second thermal values of the fourth image elements having the same color coordinates in the candidate image to the sum of the second thermal values of all the fourth image elements of the candidate image; generating the second color feature data of the candidate image according to the color coordinates and a corresponding second ratio.

In some embodiments, the color channels include a red channel, a green channel, and a blue channel.

In some embodiments, the first thermal value of the third image element in the input image is obtained from the first thermal value of the first image element in the input image; and/or the second thermal value of the fourth image element in the candidate image is obtained according to the second thermal value of the second image element in the candidate image.

In some embodiments, a first image element in the input image overlaps with an integer number of consecutive third image elements in the input image; and/or the second image element in the candidate image overlaps with an integer number of consecutive fourth image elements in the candidate image.

In some embodiments, the color similarity distance includes earth mover's distance (EMD).

In some embodiments, the step of determining the candidate image, among the multiple candidate images, that matches the color of the input image as an output image according to each color similarity distance includes: comparing the color similarity distance between the first color feature data of the input image and the second color feature data of the candidate image with a first distance threshold; when the color similarity distance is less than or equal to the first distance threshold, determining the candidate image as the output image.

In some embodiments, the step of determining the candidate image, among the multiple candidate images, that matches the color of the input image as an output image according to each color similarity distance includes: sorting each color similarity distance between the first color feature data of the input image and the second color feature data of each candidate image; determining one or more candidate images corresponding to the smallest color similarity distance as the output images.

In some embodiments, the first color feature data includes at least one of the third color feature data based on the first grayscale interval unit and the fourth color feature data based on the second grayscale interval unit, and the second color feature data includes at least one of the fifth color feature data based on the first grayscale interval unit and the sixth color feature data based on the second grayscale interval unit. The grayscale interval range of each sub-grayscale interval unit of the first grayscale interval unit is larger than the grayscale interval range of each sub-grayscale interval unit of the second grayscale interval unit.

The step of calculating the color similarity distance between the first color feature data and each second color feature data respectively, and determining the candidate image, among the multiple candidate images, that matches the color of the input image as an output image according to each color similarity distance includes: calculating the first color similarity distance between the third color feature data and each fifth color feature data respectively; comparing each first color similarity distance with the second distance threshold respectively; when the first color similarity distance is greater than the second distance threshold, removing the candidate image corresponding to the first color similarity distance; when the first color similarity distance is less than or equal to the second distance threshold, retaining the candidate image corresponding to the first color similarity distance; for each candidate image that is retained, calculating the second color similarity distance between the fourth color feature data and each sixth color feature data respectively; sorting each second color similarity distance; determining one or more candidate images corresponding to the smallest second color similarity distance as output images.

In some embodiments, the grayscale interval range of each sub-grayscale interval unit of the first grayscale interval unit is an integer multiple of the grayscale interval range of each sub-grayscale interval unit of the second grayscale interval unit.

In a second aspect of the present disclosure, a recognition processing device is provided, the recognition processing device includes a processor and a memory, and commands are stored in the memory. When the commands are executed by the processor, the steps of the above recognition processing method are implemented.

In some embodiments, the recognition processing device is further configured to perform recognition on the input image to obtain the plurality of candidate images.

In some embodiments, the recognition processing device is configured for recognition of plants.

In a third aspect of the present disclosure, a non-transient computer-readable storage medium is provided, and commands are stored in the non-transient computer-readable storage medium. When the commands are executed, the steps of the above recognition processing method are implemented.

Other features of the present disclosure and advantages thereof will become more apparent through the following detailed description of exemplary embodiments of the present disclosure with reference to the accompanying drawings.

BRIEF DESCRIPTION OF THE DRAWINGS

The accompanying drawings, which constitute a part of this specification, illustrate the embodiments of the disclosure and together with the description serve to explain the principles of the disclosure.

The present disclosure can be more clearly understood from the following detailed description with reference to the accompanying drawings, in which:

FIG. 1 is a schematic flowchart of a recognition processing method according to an exemplary embodiment of the present disclosure.

FIG. 2 is a schematic input image according to a specific example of the present disclosure.

FIG. 3 is a schematic first thermal distribution diagram corresponding to the schematic input image in FIG. 2.

FIG. 4 is a partial flowchart of a recognition processing method according to an exemplary embodiment of the present disclosure.

FIG. 7 is a partial flowchart of a recognition processing method according to an exemplary embodiment of the present disclosure.

FIG. 8 is a partial flowchart of a recognition processing method according to an exemplary embodiment of the present disclosure.

Figures 5, 6:
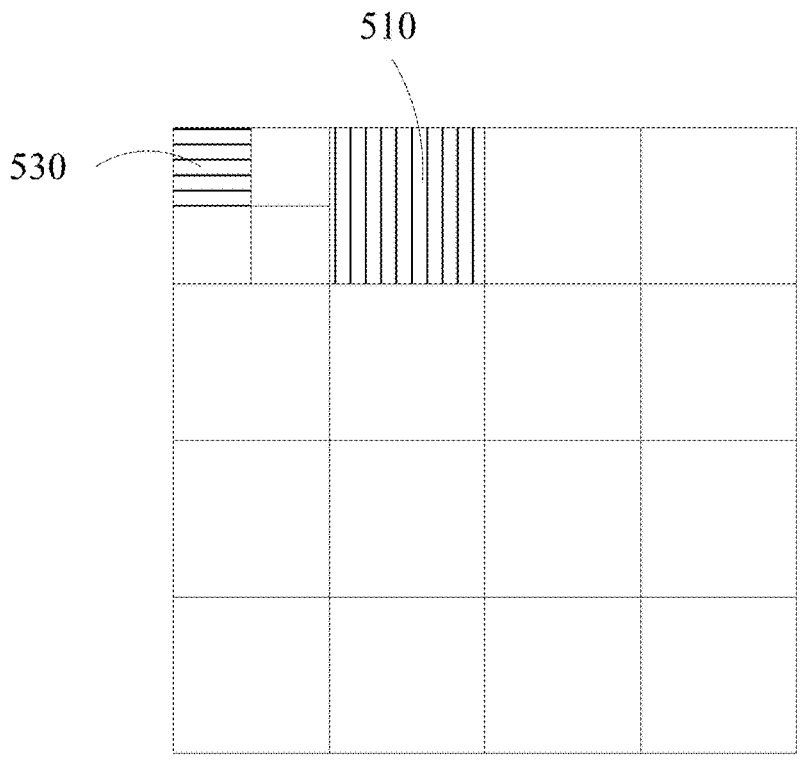
FIG. 5 is a schematic diagram of a first image element and a third image element of an input image according to a specific example of the present disclosure.
FIG. 6 is a grayscale histogram of an input image according to a specific example of the present disclosure.

Note that in the embodiments described below, the same reference numerals are commonly used in different drawings in some cases to denote the same parts or parts having the same functions, and repeated explanations thereof are omitted. In some instances, similar reference numerals and letters are used to denote similar items, so that once an item is defined in one figure, it does not require further discussion in subsequent figures.

In order to facilitate understanding, the position, size, range, etc. of each structure shown in the drawings and the like may not represent the actual position, size, range, and the like. Therefore, the present disclosure is not limited to the positions, sizes, ranges, etc. disclosed in the drawings and the like.

DESCRIPTION OF THE EMBODIMENTS

Various exemplary embodiments of the present disclosure will be described in detail below with reference to the accompanying drawings. It should be noted that relative arrangements of components and steps, numerical expressions and numerical values set forth in these embodiments do not limit the scope of the present disclosure unless specifically stated otherwise.

The following description of at least one exemplary embodiment is merely illustrative in nature and in no way intended as any limitation of the disclosure, its application or uses. That is, the structures and methods herein are presented by way of example to illustrate various embodiments of the structures and methods of this disclosure. It should be understood by those skilled in the art that these examples indicate embodiments of the present disclosure by way of illustration only, and not exhaustively. Furthermore, the figures are not necessarily to scale and some features may be exaggerated to show details of particular components.

Techniques, methods and devices known to those of ordinary skill in the relevant art may not be discussed in detail, but where appropriate, such techniques, methods and devices should be considered part of the description.

In all examples shown and discussed herein, any specific values should be construed as merely exemplary, and non-limiting. Therefore, other examples of the exemplary embodiment may have different values.

When identifying objects, in order to avoid confusion and troublesome caused to the user due to the obvious difference between the color of the output image generated according to the recognition result and the color of the input image uploaded by the user, in this disclosure, multiple candidate images generated according to the recognition results may be screened based on the color similarity distance, and an output image that matches the color of the input image may be determined to facilitate further comparison and understanding for the user, thereby improving the user experience.

In an exemplary embodiment of the present disclosure, a recognition processing method is provided. As shown in FIG. 1, the recognition processing method may include: step S100, obtaining first thermal distribution data of an input image, and calculating first color feature data of the input image according to the first thermal distribution data.

The first thermal distribution data includes a first thermal value of at least a portion of the input image. In some embodiments, the first thermal distribution data may include the first thermal value of each portion in the input image, so as to facilitate subsequent processing. However, embodiments of the present disclosure are not limited thereto. In some other embodiments, some preprocessing may also be performed on the input image, such as removing edge regions in the input image that are normally less relevant to recognition. In this way, only the first thermal values of the remaining regions in the input image that are highly relevant to the recognition are obtained, thereby reducing the amount of data to be processed and improving processing efficiency.

The first thermal distribution data may reflect the attention weight for the corresponding portion in the input image, or in other words, reflect the degree of relevance between the corresponding portion in the input image and the recognition. Generally, the larger the first thermal value of a certain portion of the input image, the higher the attention weight for this portion, or the higher the relevance between this portion and recognition, the greater the influence on the final recognition result. For example, in the case of identifying plants, it may be understood that regions in the input image that contain plants generally have a higher first thermal value, while other regions such as the image background that does not contain plants have a lower first thermal value.

In a specific example, a schematic input image is shown in FIG. 2. The region 210 corresponds to the core of the plant flower, the region 220 corresponds to the petal of the plant flower, the region 230 corresponds to the leaf of the plant, and the regions 241, 242 and 243 correspond to the non-plant image background. In FIG. 2, various regions filled in different ways have different colors.

In some embodiments, the first thermal distribution data may be expressed as a first thermal distribution diagram. For example, FIG. 3 shows a schematic first thermal distribution diagram corresponding to the schematic input image in FIG. 2. In FIG. 3, the lighter the color, the higher the first thermal value of the corresponding region. It can be seen that the region 310 in the dashed-line box substantially corresponding to the flowers and leaves of plants in FIG. 3 has a higher first thermal value, and the region 320 outside the dashed-line box corresponding to the non-plant image background has a lower first thermal value. In addition, in the image background region, as the distance from the plant increases, the first thermal value of the corresponding position also decreases.

In some embodiments, for the convenience of calculation, the value range of the first thermal value may be between 0 and 1, and the closer the first thermal value is to 1, the higher the attention weight for the corresponding region is. For example, in the case of identifying plants, the first thermal value of the region where the plant is located in the input image may be equal to or close to 1, and the first thermal value of the non-plant image background region may be equal to or close to 0, while the first thermal value in the transition region between the plant region and the image background region may be a value greater than 0 and less than 1.

The first thermal distribution data of the input image may be acquired in various ways. In some embodiments, the step of acquiring the first thermal distribution data of the input image may include: using a pre-trained machine learning model to determine a first thermal value of each first image element in the input image.

In the input image, each first image element may include one or more pixels. In general, the fewer pixels each first image element contains, the finer the acquired first thermal distribution data of the input image, but the amount of data to be processed in the subsequent steps is often large. Therefore, the first image element may be determined with the compromise between the required fineness and computing resources. Typically, each of the first image elements of the input image does not overlap each other, and all the first image elements of the input image may completely overlap the entire input image. By setting the first image element in this way, through the first thermal value of each first image element, it is possible to obtain the first thermal distribution data of the entire input image completely and efficiently, so as to facilitate subsequent processing.

In some embodiments, the machine learning model may include an attention model. The attention model may be configured to obtain the attention weight for each image element in the image, and the thermal value of the image element increases with the increase of the attention weight. Specifically, the attention model is able to imitate the attention of the human brain, and use the limited attention for obtain more crucial information from the large amount of information contained in the image, so as to reduce the burden on computing resources during the image processing process and improve image processing effect.

In other embodiments, the machine learning model may include an object identification model. The object identification model may be configured to acquire the region where the object to be identified is located in the image, for example, the object identification model may determine the contour of the object to be identified in the image. Further, the image element located in the region where the object to be identified is located may have a larger thermal value, the image element located in the region without the object to be identified may have a smaller thermal value, and the thermal value of an image element or a region may also decrease as the distance between the image element or the region and the object to be identified increases.

In addition, after running the machine learning model for a period of time, or when the accuracy of the machine learning model changes, the machine learning model may be retrained and optimized based on new data to help improve the accuracy of the thermal distribution data of the acquired images.

In order to improve the accuracy of calculating the color similarity distance in the subsequent steps and reduce the boundary error and the interference caused by the drastic changes of the first thermal distribution data, the first thermal distribution data may also be blurred or smoothed. Specifically, the step of acquiring the first thermal distribution data of the input image may include: blurring the first thermal value of each portion of the input image to generate smoothed first thermal distribution data.

Multiple methods may be used to perform blurring or smoothing processing on the first thermal distribution data, for example, at least one of Gaussian blurring, box blurring, and median blurring may be used.

In Gaussian blurring processing, Gaussian distribution may be used to calculate the transformation of the first thermal value of each first image element in the first thermal distribution data of the input image, which is equivalent to convolving the first thermal distribution data with the Gaussian distribution, so as to generate the first thermal distribution data after blurring or smoothing processing. In two dimensions, the Gaussian distribution equation may be expressed as follows:

$$G(r) = \frac{1}{2\pi\sigma^2} e^{-r^2/(2\sigma^2)}$$

In the equation, r is the blur radius, and $\sigma$ is the standard deviation of the Gaussian distribution. Among the first thermal values of the first image element after blurring, the first thermal value of the first image element before blurring accounts for the largest weight. The weight of the first thermal values of the first image element around the first image element before blurring decreases as their distance away from the first image element increases. Through Gaussian blur processing, noise in the first thermal distribution data may be effectively filtered out.

In the box blurring process, the first thermal value of the first image element after the blurring process may be the average value of the first thermal values of several first image elements associated with the first image element before the blurring process.

In the median blurring process, the first thermal value of the first image element after blurring may be the median of the first thermal values of several first image elements associated with the first image element before blurring.

In other embodiments, other blurring processing methods may also be used to process the first thermal distribution data as required, which will not be repeated here.

After obtaining the first thermal distribution data of the input image, the first color feature data thereof may be calculated. In some embodiments, as shown in FIG. 4, the step of calculating the first color feature data of the input image according to the first thermal distribution data may include: step S111, determining the color coordinates of the color of each third image element in the input image; step S112, for each color coordinates, calculating a first ratio of the sum of the first thermal values of the third image elements having the same color coordinates in the input image to the sum of the first thermal values of all the third image elements of the input image; step S113, generating first color feature data according to the color coordinates and a corresponding first ratio.

Each coordinate component of the color coordinates may respectively indicate the grayscale interval that the color falls within on each color channel.

Each third image element in the input image may include one or more pixels, and in each third image element, the colors are the same or substantially the same, so that the same color coordinates may be used to characterize the color of the third image element. Typically, each third image element of the input image does not overlap each other, and all third image elements of the input image may completely overlap the entire input image. By setting each third image element in this way, it is possible to obtain the first color distribution data of the entire input image completely and efficiently, so as to facilitate subsequent processing.

In some embodiments, the third image element may be equal to the first image element, and accordingly, the first thermal value of the third image element may be obtained directly according to the first thermal value of the first image element. In some other embodiments, it is considered that in the input image, the change of the first thermal values between different regions are often not as significant as the change of colors between different regions, that is, the area of the smallest region with the same first thermal value might be larger than the area of the smallest region with the same color coordinates. Therefore, the first image element larger than the third image element may be selected to simplify the processing of the data. In this case, the first thermal value of the associated third image element may be obtained according to the first thermal value of the first image element. In some embodiments, the first image element in the input image may overlap with an integer number of consecutive third image elements in the input image, so as to facilitate the calculation of the color similarity distance. As shown in FIG. 5, in a specific example, the first image element 510 may overlap with four third image elements 530.

In a specific example, the color channels may include a red channel, a green channel, and a blue channel. The color coordinates of the color of the j-th third image element in the input image may be expressed as $(R_{ij}, G_{ij}, B_{ij})$, where $R_{ij}$ represents the grayscale interval of the color of the j-th third image element that falls within on the red channel, $G_{ij}$ represents the grayscale interval of the color of the j-th third image element that falls within on the green channel, and $B_{ij}$ represents the grayscale interval of the color of the j-th third image element that falls within on the blue channel.

Assume that in the entire color space, the value of the grayscale on each color channel may be an integer between 0~255. Then, the value 0 may be used to represent the grayscale interval corresponding to the grayscale between 0 and 63, the value 1 may be used to represent the grayscale interval corresponding to the grayscale between 64 and 127, the value 2 may be used to represent the grayscale interval corresponding to the grayscale between 64 and 127, and the value 3 may be used to represent the grayscale interval corresponding to the grayscale between 196 and 255. Based on the division of such grayscale intervals, the grayscale compression on each color channel may be realized, so as to reduce the amount of data to be processed. According to the above definition of the grayscale interval, if the grayscale values of the color of a third image element in the input image are 14, 80, and 160 on the red channel, green channel, and blue channel respectively, then the color coordinates of the color of the third image element may be expressed as (0, 1, 2). Further, through the third image elements in the input image, the color coordinates of the color of each third image element may be obtained. With the definition of the above grayscale interval, there may be at most 64 (4×4×4) different color coordinates for the input image.

Then, for each color coordinates, a first ratio of the sum of the first thermal values of the third image elements having the same color coordinates in the input image to the sum of the first thermal values of all the third image elements of the input image may be calculated respectively.

In a specific example, it is assumed that the number of third image elements with color coordinates (0, 1, 2) in the input image is five, and the first thermal values of these five third image elements are 0.5, 0.6, 0.6, 0.8, 0.8, then, a vector (0, 1, 2, 3.3) may be constructed for the color coordinates (0, 1, 2), where the first three components of the vector respectively correspond to the grayscale interval of the color of the third image element on each color channel, and the fourth component of the vector corresponds to the sum of the first thermal values of the five third image elements with color coordinates (0, 1, 2). Similar operations may be performed for every other color coordinates the input image has to construct such a vector.

In order to facilitate the calculation of the color similarity distance between input images of different sizes and candidate images in subsequent steps, the vectors constructed above may be normalized. Specifically, the normalization process may be performed based on the sum of the first thermal values of all third image elements in the input image, that is, the calculation of the first ratio of the sum of the first thermal values of the third image elements having the same color coordinates in the input image to the sum of the first thermal values of all the third image elements of the input image, and the first ratio is adopted to replace the fourth component in the above-constructed vector.

In a specific example, it is assumed that the color coordinates that the input image has only include (0, 0, 0), (0, 0, 1) and (0, 0, 2). According to the sum of the first thermal values of the third image elements corresponding to each color coordinates, the three vectors before normalization may be obtained as (0, 0, 0, 2.5), (0, 0, 1, 2.5) and (0, 0, 2, 2.5). Thereafter, the above three vectors are normalized, and the normalized vectors are (0, 0, 0, ⅓), (0, 0, 1, ⅓) and (0, 0, 2, ⅓). It can be seen that in the normalized vector, the sum of the fourth component is 1(⅓+⅓+⅓).

The grayscale histogram may be used to represent the sum of the normalized first thermal values corresponding to each color coordinates in the input image, so as to reflect the distribution of the color coordinates or the grayscale distribution law of the input image. The larger the sum of the normalized first thermal values corresponding to a certain color coordinates, the higher the attention weight for such color in the input image, and the higher influence on the final recognition result.

FIG. 6 shows a grayscale histogram of the input image in a specific example, where the values of the abscissa represent each color coordinates in a total of 64 possible color coordinates (for example, the color coordinates (1, 0, 1) may be characterized by an abscissa value of 17), the ordinate represents the first ratio of the sum of the first thermal value of the third image element of each color coordinates to the sum of the first thermal values of all third image elements.

Further, according to the color coordinates and the corresponding first ratio, the first color feature data may be generated. In some embodiments, the first color feature data may be represented as a vector or a set of vectors. Assuming that $p_k$ represents the first ratio corresponding to the k-th color coordinates $(R_k, G_k, B_k)$ of the input image, then the first color feature data of the input image may be expressed as $\{(R_1, G_1, B_1, p_1), (R_2, G_2, B_2, p_2), \ldots, (R_M, G_M, B_M, p_M)\}$, where M is the total number of different color coordinates that the input image has.

In an exemplary embodiment of the present disclosure, a similar operation may be performed for each candidate image among a plurality of candidate images obtained according to the recognition of the input image, so as to obtain the second color feature data of each candidate image respectively.

Specifically, as shown in FIG. 1, the recognition processing method may include: step S200, obtaining second thermal distribution data of each candidate image among multiple candidate images respectively, and calculating second color feature data of a corresponding candidate image respectively according to each second thermal distribution data.

The second thermal distribution data of the candidate image may include the second thermal value of at least a portion of the candidate image. In some embodiments, the second thermal distribution data may include the second thermal value of each portion in the candidate image, so as to facilitate subsequent processing. However, embodiments of the present disclosure are not limited thereto. In some other embodiments, it is also possible to refer to the pre-processing of the input image and perform some pre-processing on the candidate image, such as removing the edge region in the candidate image, so as to obtain only the second thermal value of the remaining regions in the candidate image, so as to reduce the amount of data to be processed and improve processing efficiency.

The second thermal distribution data may reflect the attention weight for the corresponding part in the candidate image, or in other words, reflect the degree of relevance between the corresponding part in the candidate image and the recognition result. Generally, the larger the second thermal value of a certain part in the candidate image, the higher the attention weight for this part, or the higher the relevance between this part and the recognition result. For example, in the case of identifying plants, the region containing plants in the candidate image generally has a higher second thermal value, while other regions such as the image background that does not contain plants have a lower second thermal value.

In some embodiments, the value range of the second thermal value may also be between 0 and 1, and the closer the second thermal value is to 1, the higher the attention weight for the corresponding region is.

The second thermal distribution data of the candidate image may be acquired in various ways. In some embodiments, the step of acquiring the second thermal distribution data of each candidate image in the plurality of candidate images respectively may include: for each candidate image, using a pre-trained machine learning model to determine the second thermal value of each second image element respectively in the candidate image.

In the candidate image, each second image element may include one or more pixels. In general, the fewer pixels each second image element contains, the finer the acquired second thermal distribution data of the acquired candidate image, but the amount of data to be processed in the subsequent steps is often large. Therefore, the second image element may be determined with the compromise between the required fineness and computing resources. Typically, each of the second image elements of the candidate image does not overlap each other, and all the second image elements of the candidate image may completely overlap the entire candidate image. By setting the second image element in this way, through the second thermal value of each second image element, it is possible to obtain the second thermal distribution data of the entire candidate image completely and efficiently, so as to facilitate subsequent processing. In different embodiments, the number of pixels included in the second image element may be the same as or different from the number of pixels included in the first image element as required.

The machine learning model used to obtain the second thermal distribution data of each candidate image may include at least one of the above-mentioned attention model and object identification model, and may also include other models as required, which will not be described here.

It should be noted that there is a certain difference between the second thermal distribution data of the candidate image and the first thermal distribution data of the input image, because the position of the region of attention may be different in the candidate image and the input image.

In order to improve the accuracy of calculating the color similarity distance in the subsequent steps and reduce the boundary error and the interference caused by the drastic changes of the second thermal distribution data, the second thermal distribution data may also be blurred or smoothed. Specifically, the step of acquiring the second thermal distribution data of each candidate image of multiple candidate image respectively may include: for each candidate image, blurring the second thermal value of each portion of the candidate image respectively to generate smoothed second thermal distribution data of the candidate image.

Similarly, at least one of the aforementioned Gaussian blurring, box blurring, and median blurring may be used to blur or smooth the second thermal distribution data, or other blurring methods may also be used as required to perform blur processing on the second thermal distribution data.

After obtaining the second thermal distribution data of each candidate image, the corresponding second color feature data may be calculated. In some embodiments, the step of calculating the second color feature data of the corresponding candidate image respectively according to each second thermal distribution data may include: as shown in FIG. 7, for each candidate image, the following operations may be performed: step S211, determining the color coordinates of the color of each four image element in the candidate image; step S212, for each color coordinates in the same candidate image, calculating a second ratio of the sum of the second thermal values of the fourth image elements having the same color coordinates in the candidate image to the sum of the second thermal values of all the fourth image elements of the candidate image; step S213, generating second color feature data of the candidate image according to the color coordinates and a corresponding second ratio.

For each candidate image, the method of calculating the second color feature data thereof is similar to the method of calculating the first color feature data of the input image described above, and will not be repeated here.

Similarly, in some embodiments, the fourth image element may be equivalent to the second image element, and accordingly, the second thermal value of the fourth image element may be obtained directly according to the second thermal value of the second image element. In some other embodiments, it is considered that in the candidate image, the change of the second thermal values between different regions are often not as significant as the change of colors between different regions. Therefore, the second image element larger than the fourth image element may be selected to simplify the processing of the data. In this case, the second thermal value of the associated fourth image element may be obtained according to the second thermal value of the second image element. In some embodiments, the second image element in the candidate image may overlap with an integer number of consecutive fourth image elements in the candidate image, so as to facilitate the calculation of the color similarity distance.

In some embodiments, the second color feature data may also be expressed as a vector or a set of vectors. Assuming that $p_{xk}$ represents the second ratio corresponding to the k-th color coordinates $(R_{xk}, G_{xk}, B_{xk})$ in the x-th candidate image, then, for the x-th candidate image, the second color feature data thereof may be expressed as $\{(R_{x1},G_{x1},B_{x1},p_{x1}), (R_{x2}, G_{x2},B_{x2},p_{x2}), \ldots, (R_{xN},G_{xN},B_{xN},p_{xN})\}$, where N is the total number of different color coordinates that the x-th candidate image has.

Further, according to an exemplary embodiment of the present disclosure, as shown in FIG. 1, the recognition processing method may further include: step S300, calculating the color similarity distance between the first color feature data and each second color feature data respectively, and determining the candidate image, among the multiple candidate images, that matches the color of the input image as an output image according to each color similarity distance.

In some embodiments, the color similarity distance includes EMD, and EMD may be used to measure image similarity, meaning the sum of the products of the number of moves and the distance required to transform one vector into another. Specifically, the color similarity distance Dx between the first color feature data $\{(R_1,G_1,B_1,p_1), (R_2,G_2, B_2,p_2), \ldots, (R_M,G_M,B_M,p_M)\}$ of the input image and the second color feature data $\{(R_{x1},G_{x1},B_{x1},p_{x1}), (R_{x2},G_{x2},B_{x2}, p_{x2}), \ldots, (R_{xN},G_{xN},B_{xN},p_{xN})\}$ of the x-th candidate image may be calculated according to the following equation:

$$Dx = \frac{\sum_{a=1}^{M} \sum_{b=1}^{N} d_{ab} f_{ab}}{\sum_{a=1}^{M} \sum_{b=1}^{N} f_{ab}}$$

In the equation, the matrix element $d_{ab}$ in the distance matrix $[d_{ab}]$ represents the distance between the a-th color coordinates $(R_a, G_a, B_a)$ of the input image and the b-th color coordinates $(R_{xb}, G_{xb}, B_{xb})$ of the x-th candidate image, and the distance matrix $[d_{ab}]$ is an M×N matrix. The flow matrix $[f_{ab}]$ is associated with minimizing the global cost function $$\sum\nolimits_{a=1}^{M} \sum\nolimits_{b=1}^{N} d_{ab} f_{ab},$$

and the matrix element $f_{ab}$ in this flow matrix $[f_{ab}]$ represents the amount of flow from the a-th color coordinates $(R_a, G_a, B_a)$ of the input image to the b-th color coordinates $(R_{xb}, G_{xb}, B_{xb})$ of the x-th candidate image.

It can be understood that, in some other embodiments, other types of distances may also be adopted to characterize the color similarity distance between the first color feature data of the input image and the second color feature data of the candidate image as required, which will not be repeated here.

After the color similarity distance is calculated, the candidate images may be screened to determine an output image that matches the color of the input image.

In some embodiments, the step of determining the candidate image, among the plurality of candidate images, that matches the color of the input image as the output image according to each color similarity distance may include: comparing the color similarity distance between the first color feature data of the input image and the second color feature data of the candidate image with a first distance threshold; when the color similarity distance is less than or equal to the first distance threshold, determining the candidate image as the output image.

Specifically, the first distance threshold may be preset as required. When determining the output image, as long as the color similarity distance between the candidate image and the input image is less than or equal to the preset first distance threshold, the candidate image may be determined as the output image, and the output image may be output to the user to facilitate the user to make comparison and comprehend. The number of output images may be one or more. When the set first distance threshold is small, the colors of the obtained output image and the input image are closer, and the number of output images that meet the color matching conditions might be fewer.

In some other embodiments, the step of determining the candidate image, among the plurality of candidate images, that matches the color of the input image as the output image according to each color similarity distance may include: sorting each color similarity distance between the first color feature data of the input image and the second color feature data of each candidate image; determining one or more candidate images corresponding to the smallest color similarity distance as the output images.

In this case, the output image obtained is normally one (in special cases, it is possible to obtain multiple output images having the same color similarity distance as the input image), and the output image has the color closest to the input image among all candidate images. However, when using this method to determine the output image, if the color similarity distance between all candidate images and the input image is very large, the resulting output image might still fail to meet the color matching requirements.

On the one hand, in order to improve the efficiency of screening candidate images as output images, and on the other hand, in order to ensure the color matching degree between the obtained output image and the input image as much as possible, in other embodiments, the color similarity distance between the input image and the candidate image may be calculated based on two or more different grayscale intervals, and then the output image may be determined from multiple candidate images.

In a specific example, the first color feature data may include at least one of the third color feature data based on the first grayscale interval unit and the fourth color feature data based on the second grayscale interval unit, and the second color feature data may include at least one of fifth color feature data based on the first gray scale interval unit and sixth color feature data based on the second grayscale interval unit, where the grayscale interval range of each sub-grayscale interval unit of the first grayscale interval unit is greater than the grayscale interval range of each sub-grayscale interval unit of the second grayscale interval unit. As shown in FIG. 8, the step of calculating the color similarity distance between the first color feature data and each second color feature data respectively, and determining the candidate image, among the multiple candidate images, that matches the color of the input image as an output image according to each color similarity distance may include: step S310, calculating the first color similarity distance between the third color feature data and each fifth color feature data respectively; step S320, comparing each first color similarity distance with the second distance threshold respectively; step S331, when the first color similarity distance is greater than the second distance threshold, removing the candidate image corresponding to the first color similarity distance; step S332, when the first color similarity distance is less than or equal to the second distance threshold, retaining the candidate image corresponding to the first color similarity distance; step S340, for each retained candidate image, calculating the second color similarity distance between the fourth color feature data and each sixth color feature data respectively; step S350, sorting each second color similarity distance; step S360, determining one or more candidate images corresponding to the smallest second color similarity distance as output images.

In some embodiments, for the convenience of calculation, the grayscale interval range of each sub-grayscale interval unit of the first grayscale interval unit may be an integer multiple of the grayscale interval range of each sub-grayscale interval unit of the second grayscale interval unit.

For example, based on the first grayscale interval unit (in each sub-grayscale interval unit of the first grayscale interval unit, there can be 64 optional grayscale values), the value 0 may be used to represent the grayscale interval corresponding to the grayscale between 0-63, the value 1 represents the grayscale interval corresponding to the grayscale between 64-127, the value 2 represents the grayscale interval corresponding to the grayscale between 128-195, and the value 3 represents the grayscale interval corresponding to the grayscale between 196-255, so as to compress the grayscale on each color channel, and thereby obtaining the third color feature data of the input image based on the first grayscale interval unit and the fifth color feature data of each candidate image.

In addition, based on the second grayscale interval unit (in each sub-grayscale interval unit of the second grayscale interval unit, there can be 32 optional grayscale values), the value 0 may be used to represent the grayscale interval corresponding to the grayscale between 0-31, the value 1 represents the grayscale interval corresponding to the grayscale between 32-63, the value 2 represents the grayscale interval corresponding to the grayscale between 64-95, the value 3 represents the grayscale interval corresponding to the grayscale between 96-127, the value 4 represents the grayscale interval corresponding to the grayscale between 128-159, the value 5 represents the grayscale interval corresponding to the grayscale between 160-191, the value 6 represents the grayscale interval corresponding to the grayscale between 192-223, and the value 7 represents the grayscale interval corresponding to the grayscale between 224-255, so as to compress the grayscale on each color channel, and thereby obtaining the fourth color feature data of the input image based on the second grayscale interval unit and the sixth color feature data of each candidate image. Based on the second grayscale interval unit, there may be a total of 512 (8×8×8) different color coordinates in the image. It can be understood that the color feature data based on the second grayscale interval unit is more refined in characterizing the image color than the color feature data based on the first grayscale interval unit.

After obtaining the corresponding color feature data based on different grayscale interval ranges, firstly, multiple candidate images may be roughly screened based on the first grayscale interval unit with the larger grayscale interval range of the sub-grayscale interval unit according to the second threshold distance, thereby removing the candidate images with a larger color difference from the input image. Then, in the retained candidate images, the calculated corresponding color similarity distances may be sorted based on the second grayscale interval unit with the smaller grayscale interval range of the sub-grayscale interval unit, so as to be more accurately determine one or more output images that best match the colors of the input images.

It can be understood that, in other embodiments, more grayscale interval ranges may be set as required, and the desired output image may be more accurately determined from multiple candidate images based on more grayscale interval ranges.

Figure 9:
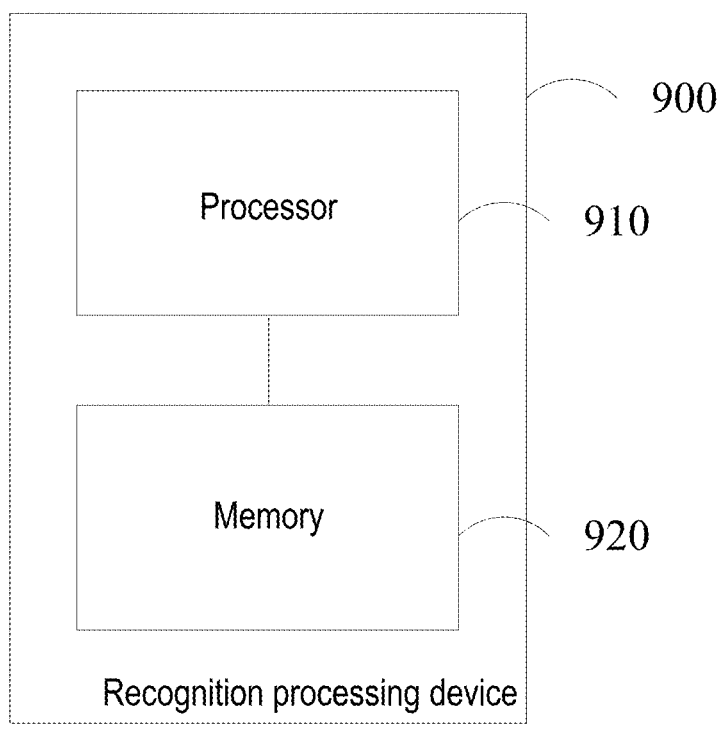
FIG. 9 is a schematic block diagram of a recognition processing device according to an exemplary embodiment of the present disclosure.

In another aspect of the present disclosure, a recognition processing device is further provided. As shown in FIG. 9, the recognition processing device 900 may include a processor 910 and a memory 920. The memory 920 stores commands. When the commands are executed by the processor 910, the steps in the recognition processing method as described above may be implemented.

The processor 910 may execute various operations and processes according to commands stored in the memory 920. Specifically, the processor 910 may be an integrated circuit chip, which has a signal processing capability. The above-mentioned processor may be a general-purpose processor, a digital signal processor (DSP), an application-specific integrated circuit (ASIC), a field programmable gate array (FPGA) or other programmable logic devices, discrete gate or transistor logic devices, and discrete hardware components. Various methods, steps and logic block diagrams disclosed in the embodiments of the present disclosure may be implemented or executed. The general-purpose processor may be a microprocessor, or the processor may be any conventional processor, etc., and may be an X86 architecture or an ARM architecture, or the like.

The memory 920 stores executable commands, and the commands are executed by the processor 910 in the recognition processing method described above. The memory 920 may be volatile memory or nonvolatile memory, or may include both volatile and nonvolatile memory. The nonvolatile memory may be read-only memory (ROM), programmable read-only memory (PROM), erasable programmable read-only memory (EPROM), electrically erasable programmable read-only memory (EEPROM), or flash memory.

Volatile memory may be random access memory (RAM), which serves as external cache memory. By way of illustration and not limitation, many forms of RAM are available such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous linked dynamic random access memory (SLDRAM), and direct memory bus random access memory (DR RAM). It should be noted that the memory of the methods described herein is intended to include, but not be limited to, these and any other suitable types of memory.

In some embodiments, the recognition processing device 900 may also be configured to recognize the input image to obtain multiple candidate images. That is to say, the recognition of the input image and the screening of the recognized candidate images may be realized by the same recognition processing device 900.

In some embodiments, the recognition processing device 900 may be configured for identification of plants. Of course, in some other embodiments, the recognition processing device 900 may also be configured to recognize other types of objects.

In another aspect of the present disclosure, a non-transient computer-readable storage medium is provided, and commands are stored in the non-transient computer-readable storage medium. When the commands are executed, steps in the recognition processing method described above may be realized.

Similarly, the non-transient computer-readable storage medium in the embodiments of the present disclosure may be either volatile memory or nonvolatile memory, or may include both volatile and nonvolatile memory. It should be noted that the non-transient computer-readable storage medium described herein is intended to include, but not be limited to, these and any other suitable types of memory.

As used herein, the words "front", "rear", "top", "bottom", "above", "under", etc., if any, are used for descriptive purposes and not necessarily to describe a constant relative position. It is to be understood that such terms are interchangeable under appropriate circumstances such that the embodiments of the disclosure described herein, for example, are capable of operating in other orientations than those shown or otherwise described herein.

As used herein, the word "exemplary" means "serving as an example, instance, or illustration" rather than as a "model" to be exactly reproduced. Any implementation described illustratively herein is not necessarily to be construed as preferred or advantageous over other implementations. Furthermore, the disclosure is not to be bound by any expressed or implied theory presented in the above-mentioned technical field, background, brief summary or detailed description.

As used herein, the word "substantially" is meant to encompass any minor variations due to defects in design or manufacture, equipment or component tolerances, environmental influences, and/or other factors. The word "substantially" also allows for differences from a perfect or ideal situation due to parasitic effects, noise, and other practical considerations that may exist in an actual implementation.

Additionally, the foregoing description may have referred to elements or nodes or features being "connected" or "coupled" together. As used herein, unless expressly stated otherwise, "connected" means that one element/node/feature is electrically, mechanically, logically or otherwise connected (or in communication) with another element/ node/feature. Similarly, unless expressly stated otherwise, "coupled" means that one element/node/feature may be directly or indirectly connected to another element/node/feature mechanically, electrically, logically or otherwise to allow interactions even though the two features may not be directly connected. That is, "coupled" is intended to encompass both direct and indirect connections of elements or other features, including connections utilizing one or more intervening elements.

In addition, "first", "second", and similar terms may also be used herein for reference purposes only, and thus are not intended to be limiting. For example, the words "first," "second," and other such numerical terms referring to structures or elements do not imply a sequence or order unless clearly indicated by the context.

It should also be noted that, as used herein, the words "comprises", "comprising", "having" and any other variants indicate the presence of indicated features, integers, steps, operations, elements and/or parts, but do not exclude presence or addition of one or more other features, integers, steps, operations, elements, components and/or combinations thereof.

In this disclosure, the term "provide" is used broadly to cover all ways of obtaining an object, so "provide something" includes, but is not limited to, "purchase", "preparation/manufacture", "arrangement/set up", "installation/assembly", and/or "order" objects, etc.

Those skilled in the art should also appreciate that the boundaries between the above-described operations are merely illustrative. Multiple operations may be combined into a single operation, a single operation may be distributed among additional operations, and operations may be performed with at least partial overlap in time. Also, alternative embodiments may include multiple instances of a particular operation, and the order of operations may be altered in other various embodiments. However, other modifications, changes and substitutions are also possible. Accordingly, the specification and drawings are to be regarded as illustrative rather than restrictive.

Although some specific embodiments of the present disclosure have been described in detail through examples, those skilled in the art should understand that the above examples are for illustration only, rather than limiting the scope of the present disclosure. The embodiments disclosed herein can be freely combined with each other without departing from the spirit and scope of the present disclosure. It will also be appreciated by those skilled in the art that modifications may be made to the above embodiments without departing from the scope and spirit of the present disclosure. The scope of the present disclosure is defined by the appended claims.

What is claimed is:

1. A recognition processing method, comprising:
obtaining a first attention distribution data of an input image, comprising:
using a pre-trained machine learning model to determine a first attention value of each of first image pixels in the input image, wherein the pre-trained machine learning model comprises an attention model, and the attention model is configured to obtain an attention weight for each of the first image pixels in the input image;
and calculating a first color feature data of the input image according to the first attention distribution data;
obtaining second attention distribution data of each of a plurality of candidate images respectively, comprising:

for each of the candidate images, using the pre-trained machine learning model to determine a second attention value of each of second image pixels respectively in the candidate image, wherein the first attention values of the first image pixels and the second attention values of the second image pixels increase with an increase of the attention weight,
and calculating second color feature data of a corresponding candidate image respectively according to each of the second attention distribution data, and the plurality of candidate images are obtained from a recognition of the input image;
calculating color similarity distances between the first color feature data and each of the second color feature data respectively, and determining a candidate image, among the plurality of candidate images, that matches a color of the input image as an output image according to each of the color similarity distances.

2. The recognition processing method according to claim 1, wherein the first attention value is greater than or equal to 0 and less than or equal to 1; and/or
the second attention value is greater than or equal to 0 and less than or equal to 1.

3. The recognition processing method according to claim 1, wherein the step of obtaining the first attention distribution data of the input image further comprises:
blurring a first attention value of each portion of the input image to generate the first attention distribution data, which is smoothed; and/or
the step of obtaining the second attention distribution data of each of the plurality of candidate images respectively comprises:
for each of the candidate images, blurring a second attention value of each portion of the candidate image to generate the second attention distribution data, which is smoothed, of the candidate image.

4. The recognition processing method according to claim 3, wherein the blurring comprises at least one of Gaussian blurring, box blurring and median blurring.

5. The recognition processing method according to claim 1, wherein the step of calculating the first color feature data of the input image according to the first attention distribution data comprises:
determining color coordinates of a color of each of third image pixels in the input image, wherein each coordinate component of the color coordinates respectively indicates a grayscale interval that a color falls within on each color channel;
for each of the color coordinates, calculating a first ratio of a sum of the first attention values of the third image pixels having the same color coordinates in the input image to a sum of the first attention values of all the third image pixels of the input image;
generating the first color feature data according to the color coordinates and the corresponding first ratio; and/or
the step of calculating the second color feature data of the corresponding candidate image respectively according to each of the second attention distribution data comprises:
performing the following operations for each of the candidate images:
determining color coordinates of a color of each of fourth image pixels in the candidate image;
for each of the color coordinates in a same candidate image, calculating a second ratio of a sum of second attention values of the fourth image pixels having the same color coordinates in the candidate image to a sum of the second attention values of all the fourth image pixels of the candidate image;

generating the second color feature data of the candidate image according to the color coordinates and the corresponding second ratio.

6. The recognition processing method according to claim 5, wherein the color channel comprises a red channel, a green channel, and a blue channel.

7. The recognition processing method according to claim 5, wherein the first attention values of the third image pixel in the input image is obtained from the first attention value of the first image pixels in the input image; and/or the second attention value of the fourth image pixel in the candidate image is obtained according to a second attention value of a second image pixel in the candidate image.

8. The recognition processing method according to claim 5, wherein a first image pixel in the input image overlaps with an integer number of the consecutive third image pixels in the input image; and/or a second image pixel in the candidate image overlaps with an integer number of the consecutive fourth image pixels in the candidate image.

9. The recognition processing method according to claim 1, wherein the color similarity distances comprise an earth mover's distance (EMD).

10. The recognition processing method according to claim 1, wherein the step of determining the candidate image, among the plurality of candidate images, that matches the color of the input image as the output image according to each of the color similarity distances comprises:

comparing the color similarity distances between the first color feature data of the input image and the second color feature data of the candidate image with a first distance threshold;

when the color similarity distances are less than or equal to the first distance threshold, determining the candidate image as the output image.

11. The recognition processing method according to claim 1, wherein the step of determining the candidate image, among the plurality of candidate images, that matches the color of the input image as the output image according to each of the color similarity distances comprises:

sorting each of the color similarity distances between the first color feature data of the input image and the second color feature data of each of the candidate images;

determining one or more candidate images corresponding to a smallest color similarity distance as the output images.

12. The recognition processing method according to claim 1, wherein the first color feature data comprises at least one of a third color feature data based on a first grayscale interval unit and a fourth color feature data based on a second grayscale interval unit, and the second color feature data comprise at least one of a fifth color feature data based on the first grayscale interval unit and a sixth color feature data based on the second grayscale interval unit, wherein a grayscale interval range of each of sub-grayscale interval units of the first grayscale interval unit is larger than a grayscale interval range of each of sub-grayscale interval units of the second grayscale interval unit;

the step of calculating the color similarity distances between the first color feature data and each of the second color feature data respectively, and determining the candidate image, among the plurality of candidate images, that matches the color of the input image as the output image according to each of the color similarity distances comprises:

calculating first color similarity distances between the third color feature data and each of the fifth color feature data respectively;

comparing each of the first color similarity distances with a second distance threshold respectively;

when the first color similarity distances are greater than the second distance threshold, removing a candidate image corresponding to the first color similarity distances;

when the first color similarity distances are less than or equal to the second distance threshold, retaining the candidate image corresponding to the first color similarity distances;

for each of the candidate images that is retained, calculating second color similarity distances between the fourth color feature data and each of the sixth color feature data respectively;

sorting each of the second color similarity distances;

determining one or more of the candidate images corresponding to a smallest second color similarity distance as the output images.

13. The recognition processing method according to claim 12, wherein the grayscale interval range of each of the sub-grayscale interval units of the first grayscale interval unit is an integer multiple of the grayscale interval range of each of the sub-grayscale interval units of the second grayscale interval unit.

14. A recognition processing device, comprising a processor and a memory, wherein commands are stored in the memory, when the commands are executed by the processor, steps of the recognition processing method as claimed in claim 1 is implemented.

15. The recognition processing device according to claim 14, wherein the recognition processing device is further configured to perform recognition on the input image to obtain the plurality of candidate images.

16. The recognition processing device according to claim 14, wherein the recognition processing device is configured for recognition of plants.

17. A non-transient computer-readable storage medium, wherein commands are stored in the non-transient computer-readable storage medium, when the commands are executed, steps of the recognition processing method as claimed in claim 1 is implemented.

* * * * *